United States Patent
Carreon-Bautista (10) Patent No.: US 12,556,088 B2
(45) Date of Patent: Feb. 17, 2026

(54) SWITCHED-MODE POWER SUPPLY WITH LOOP GAIN REDUCTION

(71) Applicant: AyDeeKay LLC, Aliso Viejo, CA (US)

(72) Inventor: Salvador Carreon-Bautista, Aliso Viejo, CA (US)

(73) Assignee: Ay Dee Kay, Aliso Viejo, CA (US)

( * ) Notice: Subject to any disclaimer, the term of this patent is extended or adjusted under 35 U.S.C. 154(b) by 447 days.

(21) Appl. No.: 18/204,377

(22) Filed: May 31, 2023

(65) Prior Publication Data

US 2023/0396166 A1 Dec. 7, 2023

Related U.S. Application Data

(60) Provisional application No. 63/348,019, filed on Jun. 2, 2022.

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC ..... H02M 1/0009; H02M 3/156; H02M 3/158
USPC .................. 323/282, 283, 284, 290; 327/540
See application file for complete search history.

(56) References Cited

U.S. PATENT DOCUMENTS

| | | | |
|---|---|---|---|
| 7,622,820 B1 * | 11/2009 | Prodic .................. | H02M 3/158 361/689 |
| 10,008,656 B1 * | 6/2018 | Radhakrishnan ....... | H03F 3/303 |
| 2009/0295355 A1 * | 12/2009 | Hirahara ............... | H02M 3/157 323/284 |
| 2016/0226451 A1 | 8/2016 | Vigraham et al. | |
| 2018/0152099 A1 * | 5/2018 | Savic .................... | H02M 3/156 |
| 2019/0173383 A1 | 6/2019 | Gao | |
| 2021/0311513 A1 | 10/2021 | Joshi et al. | |
| 2021/0376730 A1 | 12/2021 | Yan et al. | |
| 2022/0069713 A1 | 3/2022 | Khamesra et al. | |
| 2022/0407415 A1 * | 12/2022 | Bean, Jr. ................. | H02J 7/007 |
| 2024/0250613 A1 * | 7/2024 | McCue .................... | H02M 1/32 |
| 2024/0364219 A1 * | 10/2024 | Scoones ............. | H02M 3/1566 |

OTHER PUBLICATIONS

International Search Report and Written Opinion, PCT Application No. PCT/US2023/024183, Aug. 23, 2023.

* cited by examiner

*Primary Examiner* — William Hernandez

(74) *Attorney, Agent, or Firm* — Steven Stupp (57) ABSTRACT

An integrated circuit is described. This integrated circuit may include a control circuit. During operation, the control circuit may detect when an output current provided to a load exceeds a current threshold. Moreover, in response to the detection, the control circuit may reduce a loop gain associated with an amplifier in the control circuit. Note that the output current may be associated with a switched-mode power supply. For example, the reduced loop gain may transition the switched-mode power supply from a constant voltage mode to a constant current mode. In some embodiments, the output current may be associated with a power supply or a source. Notably, the reduced loop gain may transition the power supply or the source from a constant voltage mode to a constant current mode.

20 Claims, 5 Drawing Sheets

SWITCHED-MODE POWER SUPPLY WITH LOOP GAIN REDUCTION

CROSS REFERENCE TO RELATED APPLICATIONS

This application claims priority under 35 U.S.C. 119(e) to U.S. Provisional Application Ser. No. 63/348,019, entitled "Switched-Mode Power Supply with Loop Gain Reduction," by Salvador Carreon-Bautista, filed on Jun. 2, 2022, the contents of both of which are herein incorporated by reference.

FIELD

The present disclosure relates to techniques for transitioning a power supply from operating in a constant voltage mode to a constant current mode by reducing a loop gain associated with an amplifier in a control loop.

BACKGROUND

Switched-mode power supplies (which are sometimes referred to as 'switching converters') typically have different operating modes. Notably, depending on the application (such as a load or a power-sinking electronic device), a switched-mode power supply may operate in a constant voltage (CV) mode or a constant current (CC) mode. In the constant voltage mode, a switched-mode power supply outputs a predefined or fixed voltage over a range of loads. Alternatively, in the constant current mode, a switched-mode power supply outputs a predefined or fixed current for different load conditions.

When a switched-mode power supply reaches a current threshold or limit, it may transition from the constant voltage mode to the constant current mode. Notably, when a load connected to the switched-mode power supply draws or needs to draw more current than the current threshold or limit, the switched-mode power supply may transition to the constant current mode, so that switched-mode power supply has current control of the output power.

However, it can be difficult to smoothly transition a switched-mode power supply from the constant voltage mode to the constant current mode. This may be problematic, especially when the load has noise constraints. Existing approaches for transitioning from the constant voltage mode to the constant current mode include: pulling on a main compensation node (COMP) of a switched-mode power supply through a soft-start (SS) pin to limit the amount of power delivered through an inductor to the output; or pulling on the compensation node via a voltage follower to prevent the voltage on the compensation node from continuing to increase when the load needs to draw more current.

SUMMARY

Embodiments of an integrated circuit are described. This integrated circuit includes a control circuit. During operation, the control circuit detects when an output current provided to a load exceeds a current threshold. Moreover, in response to the detection, the control circuit reduces a loop gain associated with an amplifier in the control circuit.

Note that the output current may be associated with a switched-mode power supply. For example, the reduced loop gain may transition the switched-mode power supply from a constant voltage mode to a constant current mode.

Moreover, the output current may be associated with a power supply or a source. For example, the reduced loop gain may transition the power supply or the source from a constant voltage mode to a constant current mode.

Furthermore, the reduced loop gain may ensure that the amplifier has a voltage-current characteristic of an ideal current source.

Additionally, the amplifier may include a transconductance amplifier and the reduced loop gain may be associated with a reduced transconductance of the transconductance amplifier and/or a reduced output impedance of the transconductance amplifier.

In some embodiments, the reduced loop gain may ensure that a control current provided by the amplifier is reduced for a given error voltage, where the error voltage corresponds to a difference of the output current and the current threshold.

Note that the control circuit may include a second amplifier in parallel with the amplifier, where a change in a second current provided by the second amplifier when the output current exceeds the current threshold may reduce the loop gain by reducing an effective transconductance of the amplifier and/or reducing an effective output impedance of the amplifier.

Another embodiment provides an electronic device that includes the integrated circuit.

Another embodiment provides a system that includes the integrated circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method for reducing loop gain. This method includes at least some of the operations performed by the integrated circuit.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

Note that like reference numerals refer to corresponding parts throughout the drawings. Moreover, multiple instances of the same part are designated by a common prefix separated from an instance number by a dash.

DETAILED DESCRIPTION

An integrated circuit is described. This integrated circuit may include a control circuit. During operation, the control circuit may detect when an output current provided to a load exceeds a current threshold. Moreover, in response to the detection, the control circuit may reduce a loop gain associated with an amplifier in the control circuit. Note that the output current may be associated with a switched-mode power supply. For example, the reduced loop gain may transition the switched-mode power supply from a constant voltage mode to a constant current mode. In some embodiments, the output current may be associated with a power supply or a source. Notably, the reduced loop gain may transition the power supply or the source from a constant voltage mode to a constant current mode.

By reducing the loop gain, these circuit techniques may improve performance of the power supply when transitioning between constant voltage and constant current operating modes, such as the switched-mode power supply. Consequently, the circuit techniques may improve the transition performance of an electronic device that includes the integrated circuit when transitioning from constant voltage to constant current operating modes. For example, the circuit techniques may make the power supply more linear and better able to regulate the power delivered to a load. Therefore, the circuit techniques may facilitate the use of the integrated circuit in a wide variety of systems, electronic devices and applications.

We now describe embodiments of the circuit techniques. The circuit techniques may allow an integrated circuit to transition a power supply from a constant voltage mode to a constant current mode. This integrated circuit may include a control circuit. During operation, the control circuit may detect when an output current provided to a load exceeds a current threshold. Note that the output current may be associated with the power supply, such as a switched-mode power supply. In response to the detection, the control circuit may reduce a loop gain associated with an amplifier in the control circuit. The reduced loop gain may transition the power supply from the constant voltage mode to the constant current mode. Moreover, the reduced loop gain may ensure that the amplifier has characteristics of an ideal current source. For example, the reduced loop gain may ensure that a control current provided by the amplifier is reduced for a given error voltage corresponding to a difference of the output current and the current threshold.

The disclosed circuit techniques may limit the delivered output current from a switched-mode power supply by reducing the overall loop gain. Notably, when a load-current sense circuit determines or detects that a predefined current threshold or limit of the switched-mode power supply will be or has been exceeded, the switched-mode power supply may reduce the loop gain associated with an error amplifier (such as a transconductance amplifier) in a control loop in the switched-mode power supply. For example, the loop gain of the error amplifier in the control loop may be reduced by reducing a transconductance of the error amplifier and/or by reducing an output impedance of the error amplifier.

Figure 1:
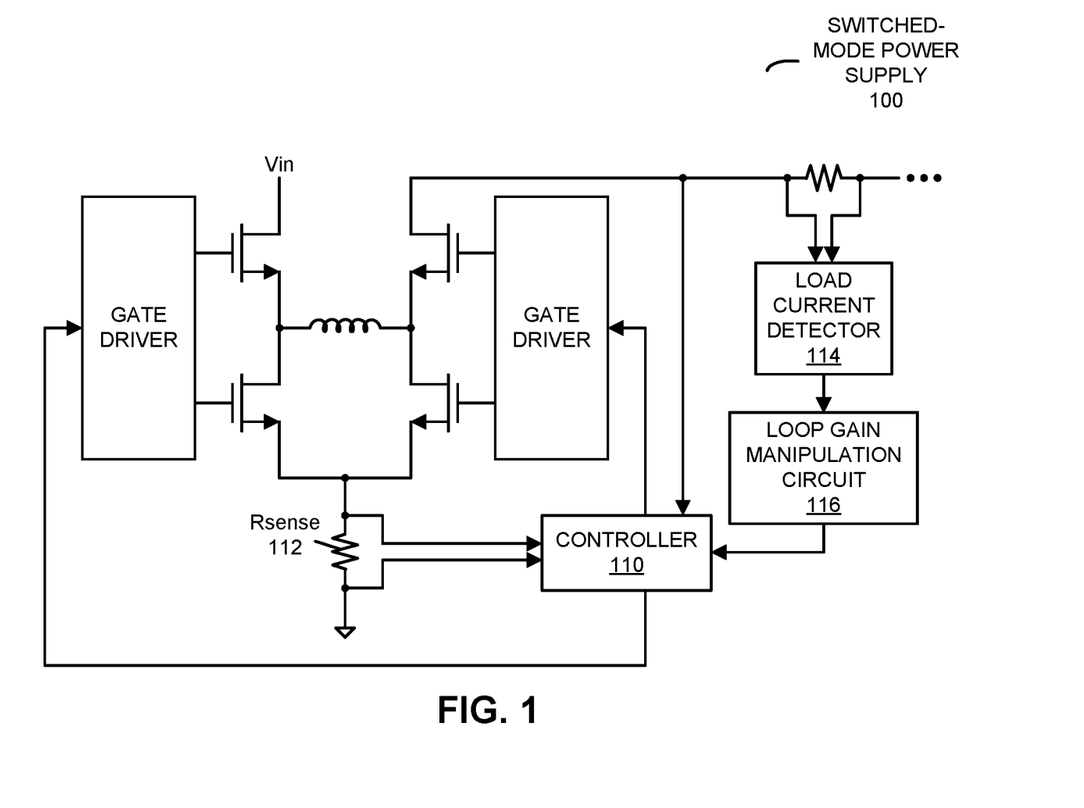
FIG. 1 is a block diagram illustrating an example of a switched-mode power supply according to some embodiments of the present disclosure.

FIG. 1 presents an example of a switched-mode power supply 100. Notably, a controller 110 (which is sometimes referred to as a 'control block', a 'control circuit' or 'control logic') may sense a current in the common path of a load device (e.g., using a sense resistor, Rsense 112) and an output voltage. In addition, a load current detector 114 (which is sometimes referred to as a 'load-current sense circuit') may measure a load current through a sense resistor (which may be included in or external to an integrated circuit that implements some or all of controller 110 and/or switched-mode power supply 100). As discussed further below, then a loop-gain manipulation circuit 116 may adjust a loop gain of controller 110, e.g., by reducing a transconductance of an error amplifier in controller 110 and/or by reducing an output impedance of the error amplifier.

Figure 2:
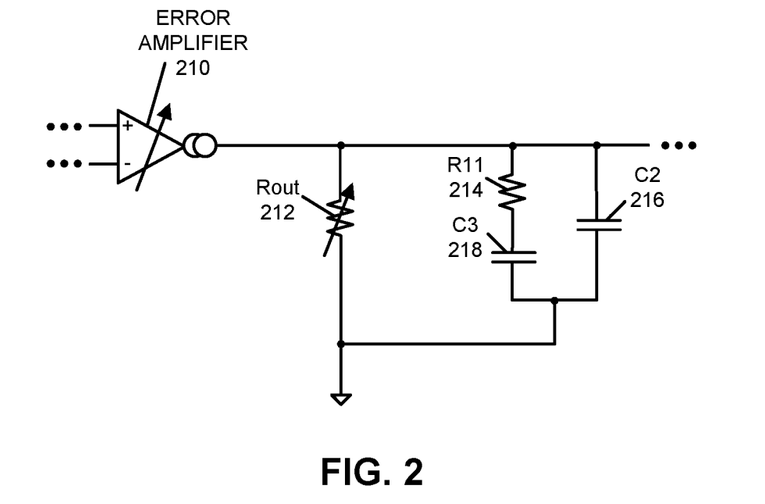
FIG. 2 is a block diagram illustrating an example of an error amplifier in a control loop of a switched-mode power supply according to some embodiments of the present disclosure.

FIG. 2 presents an example of an error amplifier 210 in the control loop of a switched-mode power supply (such as switch-mode power supply 100 in FIG. 1) and an associated internal compensation or compensation network. In FIG. 2, the positive input to error amplifier 210 is a reference voltage (which is sometimes referred to as a 'loop reference') corresponding to the target voltage of the switched-mode power supply and the negative input is, e.g., a voltage-divided input voltage (which is sometimes referred to as a 'voltage reference') corresponding to the delivered voltage to the load. Note that error amplifier 210 (such as a transconductance amplifier) has a finite output impedance Rout 212 that drives the compensation network. The voltage on the common node of resistor R11 214, capacitor C2 216 and capacitor C3 218 may be an error voltage, which is the difference of the positive and the negative inputs to error amplifier 210. Moreover, error amplifier 210 may drive a pulse-width-modulation (PWM) comparator (not shown). Based at least in part on this error-amplifier output and the current switched-mode power supply information, the PWM comparator may inform or indicate to the controller (such as controller 110 in FIG. 1) whether to increase or decrease the power of the switched-mode power supply.

In FIG. 2, the loop gain ($A_{loop}$) of error amplifier 210 may be expressed as $$A_{loop} = V_o/V_c(s) \cdot \beta \cdot G_{compensation},$$

where $V_o/V_c$ is a control-to-output transfer function of the power-delivering device/switching converter, $\beta$ is the feedback factor of error amplifier 210, and $G_{compensation}$ is the compensation that includes or corresponds to a DC gain value and poles and zeros in a feedback loop that provide compensation for the switched-mode power supply. Note that the DC gain value may correspond to or be determined by the transconductance (gm) of error amplifier 210 and the output impedance Rout 212 of error amplifier 210, and which are included in $G_{compensation}$.

When the loop gain is reduced, the DC error associated with error amplifier 210 increases. This DC error is proportional to the amount of load current that exceeds the predefined current threshold or limit of the switched-mode power supply. In principle, the increased DC error can provide a smoother transition to or from the constant current mode.

However, the reduced loop gain may need to be performed in such a way that the introduced DC error contributes to the constant current operation. Notably, the loop gain may need to be reduced so that the output voltage drops as the load current exceeds the predefined current threshold or limit. In some embodiments, this may be achieved by reducing the transconductance of a compensation stage in error amplifier 210 and/or the output impedance of error amplifier 210 by adding or switching in a parallel transconductance stage to divert current from the main error amplifier. These changes may ensure that the power-delivering device/switching converter mimics an ideal current source.

Figure 3:
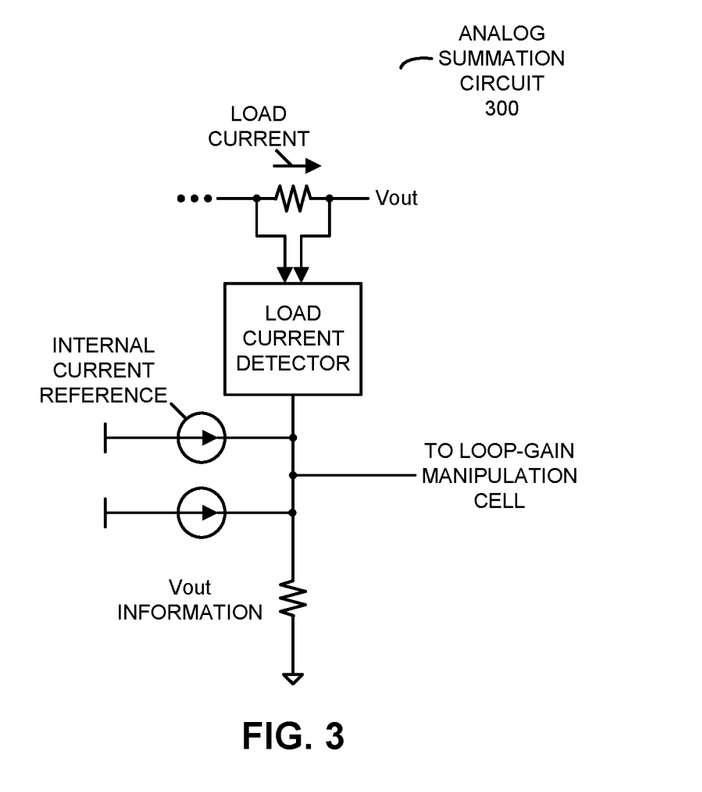
FIG. 3 is a block diagram illustrating an example of an analog summation circuit in or associated with a switched-mode power supply according to some embodiments of the present disclosure.

In some embodiments, an analog summation of currents may be used to determine whether loop-gain manipulation circuit 116 (FIG. 1) reduces a transconductance of error amplifier 210 and/or reduces the output impedance of error amplifier 210. (However, in other embodiments, the summation circuit may be implemented in the digital domain or in the analog and the digital domains.) FIG. 3 presents an example of an analog summation circuit 300 in or associated with a switched-mode power supply.

Figure 4:
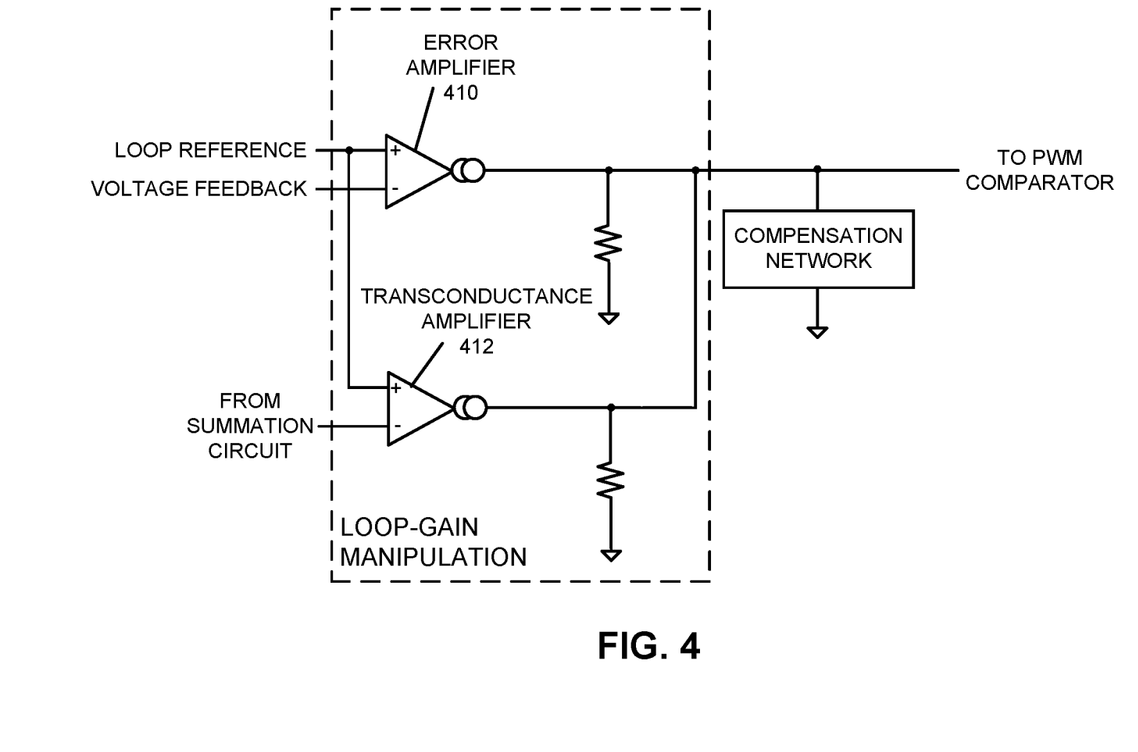
FIG. 4 is a block diagram illustrating an example of a portion of a controller in a switched-mode power supply that dynamically reduces an effective transconductance of an error amplifier and/or an effective output impedance of the error amplifier according to some embodiments of the present disclosure.

FIG. 4 presents an example of a portion of a controller in a switched-mode power supply that dynamically reduces an effective transconductance of an error amplifier 410 and/or an effective output impedance of error amplifier 410. In FIG. 4, note that a second transconductance amplifier 412 (which may perform the functions of loop-gain manipulation circuit 116 in FIG. 1) may be in parallel with error amplifier 410. Moreover, note that the output from the analog summation circuit (such as analog summation circuit 300 in FIG. 3) may be input to the positive input of the second transconductance amplifier 412. Moreover, note that the second transconductance amplifier 412 may only have current-sink capabilities.

We now further describe the circuit techniques. Note that the transition of a switched-mode power supply from a constant voltage mode to a constant current mode may be based at least in part on a load current detector (such as load current detector 114 in FIG. 1) or a load-current sense circuit. For example, a 5 mΩ resistor may be in series with the load. Consequent, a 1 A load current may generate a 5 mV voltage drop across the resistor.

The 5 mV may be converted into a current via the load current detector. For example, the load current detector may have a transconductance of 1 mA/V. Consequently, the load current detector may provide a current into the summation node of an analog summation circuit (such as analog summation circuit 300 in FIG. 3) of 5 μA. For a 1 A load current, the internal current reference may be calibrated to produce a 5 μA current, which may cancel with the incoming 5 μA current from the load current detector.

This may leave the summation node with only the output-voltage information (Vout) that is available on the summation node. The Vout information conversion from voltage to current may be set via another transconductance amplifier with a fixed transconductance. In this example, assuming a 10 μA/V transconductance, and a summing resistance of 100 kΩ, the value at the summation node may be Vout multiplied by a feedback factor. For example, Vout may be 10 V and the feedback factor may be 0.1. This may result in a value of 1 V on the summation node.

The voltage on the summation node may be compared to the loop reference (which, for a Vout of 10 V, may result in a 1 V reference). At this point, the two transconductance amplifiers in FIG. 4 (error amplifier 410 and the secondary loop-gain manipulation amplifier 412) may be fully balanced. However, when the load current exceeds 1 A the summation node may no longer be set to Vout/10, because a current associated with the load current detector may be subtracted in the analog summation circuit. For example, for a 1.5 A load current, the current subtracted from the summation node may be 7.5 μA. This is more current than the internal current reference was initially contributing. Consequently, the summation node may no longer set the voltage to Vout/10, but to a lower value of ((5 μA–7.5 μA)+10 μA)·100 kΩ or 750 mV.

In response, the loop-gain manipulation amplifier 412 in FIG. 4 may begin acting as a load on the main error amplifier 410, producing a current that is proportional to the voltage difference at its input multiplied by its transconductance. The overall effect may be to reduce the current delivering capability of the main error amplifier 410, which, effectively, is as if error amplifier 410 had a lower transconductance and/or a lower output impedance. Thus, the loop-gain manipulation amplifier may ensure that the DC error associated with the reduced loop gain is introduced in a particular direction, i.e., so that the output voltage decreases. Moreover, the loop-gain manipulation amplifier may ensure or provide a smooth transition from the constant voltage mode to the constant current mode. Note that the loop-gain manipulation amplifier may provide a voltage-controlled amplifier that modifies the effective transconductance and/or the output impedance based at least in part on its output current.

While the preceding discussion illustrated the circuit techniques with a switched-mode power supply, more generally the circuit techniques may be used with a wide variety of power supplies, sources and/or circuits. Moreover, note that the preceding embodiments may not illustrate all of the connections between components. Moreover, one or more of the preceding embodiments may include: fewer or additional components; two or more components may be combined; a single component may be split into two or more components; and/or positions of one or more components may be changed.

Figure 5:
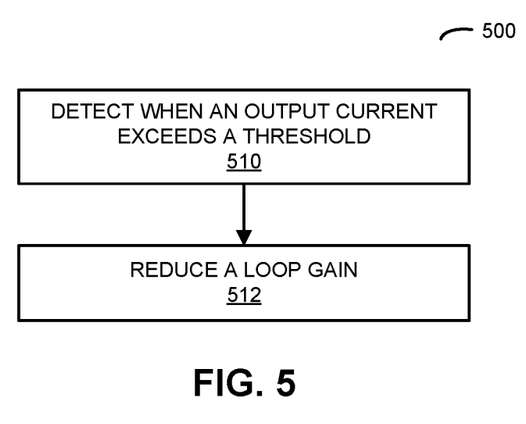
FIG. 5 is a flow diagram illustrating an example of a method for reducing loop gain according to some embodiments of the present disclosure.

We now describe embodiments of a method. FIG. 5 presents a flow diagram illustrating an example of a method 500 for reducing a loop gain. This method may be performed by an integrated circuit.

During operation, the integrated circuit may detect when an output current provided to a load exceeds a current threshold (operation 510). Then, in response to the detection, the integrated circuit may reduce the loop gain (operation 512) associated with an amplifier in a control circuit.

In some embodiments of the method 500, there may be additional or fewer operations. Moreover, the order of the operations may be changed, and/or two or more operations may be combined into a single operation.

The disclosed integrated circuit and the circuit techniques can be (or can be included in) any electronic device or system. For example, the electronic device may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, a camera or image sensor, an access point, a router, a switch, communication equipment, test equipment, a vehicle, a drone, a ship, an airplane, a car, a truck, a bus, a motorcycle, manufacturing equipment, farm equipment, construction equipment, or another type of electronic device.

Although specific components are used to describe the embodiments of the integrated circuit, in alternative embodiments different components and/or subsystems may be present in the integrated circuit. Thus, the embodiments of the integrated circuit may include fewer components, additional components, different components, two or more components may be combined into a single component, a single component may be separated into two or more components, one or more positions of one or more components may be changed, and/or there may be different types of components.

Moreover, the circuits and components in the embodiments of the integrated circuit may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that electrical coupling or connections in the preceding embodiments may be direct or indirect. In the preceding embodiments, a single line corresponding to a route may indicate one or more single lines or routes.

As noted previously, an integrated circuit may implement some or all of the functionality of the circuit techniques. This integrated circuit may include hardware and/or software mechanisms that are used for implementing functionality associated with the circuit techniques.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the circuit techniques may be implemented using program instructions that are executed by a processor or in firmware in an integrated circuit.

Moreover, while examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
a control circuit configured to:
detect when an output current provided to a load exceeds a current threshold; and
in response to the detection, reduce a loop gain associated with an amplifier in the control circuit.

2. The integrated circuit of claim 1, wherein the output current is associated with a switched-mode power supply.

3. The integrated circuit of claim 2, wherein the reduced loop gain transitions the switched-mode power supply from a constant voltage mode to a constant current mode.

4. The integrated circuit of claim 1, wherein the output current is associated with a power supply or a source.

5. The integrated circuit of claim 4, wherein the reduced loop gain transitions the power supply or the source from a constant voltage mode to a constant current mode.

6. The integrated circuit of claim 1, wherein the reduced loop gain ensures that the amplifier has a voltage-current characteristic of an ideal current source.

7. The integrated circuit of claim 1, wherein the amplifier comprises a transconductance amplifier and the reduced loop gain is associated with a reduced transconductance of the transconductance amplifier, a reduced output impedance of the transconductance amplifier or both.

8. The integrated circuit of claim 1, wherein the reduced loop gain ensures that a control current provided by the amplifier is reduced for a given error voltage; and
wherein the error voltage corresponds to a difference of the output current and the current threshold.

9. The integrated circuit of claim 1, wherein the control circuit comprises a second amplifier in parallel with the amplifier; and
wherein a change in a second current provided by the second amplifier when the output current exceeds the current threshold reduces the loop gain by reducing an effective transconductance of the amplifier, reducing an effective output impedance of the amplifier or both.

10. A non-transitory computer-readable storage medium for use in conjunction with an integrated circuit, the computer-readable storage medium storing program instructions, wherein, when executed by the integrated circuit, the program instructions cause the integrated circuit to perform operations, comprising:
detecting when an output current provided to a load exceeds a current threshold; and
in response to the detection, reducing a loop gain associated with an amplifier in a control circuit.

11. The non-transitory computer-readable storage medium of claim 10, wherein the output current is associated with a switched-mode power supply.

12. The non-transitory computer-readable storage medium of claim 11, wherein the reduced loop gain transitions the switched-mode power supply from a constant voltage mode to a constant current mode.

13. The non-transitory computer-readable storage medium of claim 10, wherein the reduced loop gain ensures that the amplifier has a voltage-current characteristic of an ideal current source.

14. The non-transitory computer-readable storage medium of claim 10, wherein the reduced loop gain ensures that a control current provided by the amplifier is reduced for a given error voltage; and     wherein the error voltage corresponds to a difference of the output current and the current threshold.

15. A method for reducing loop gain, comprising:

by an integrated circuit:

detecting when an output current provided to a load exceeds a current threshold; and     in response to the detection, reducing the loop gain associated with an amplifier in a control circuit.

16. The method of claim 15, wherein the output current is associated with a switched-mode power supply; and     wherein the reduced loop gain transitions the switched-mode power supply from a constant voltage mode to a constant current mode.

17. The method of claim 15, wherein the reduced loop gain ensures that the amplifier has a voltage-current characteristic of an ideal current source.

18. The method of claim 15, wherein the reduced loop gain ensures that a control current provided by the amplifier is reduced for a given error voltage; and     wherein the error voltage corresponds to a difference of the output current and the current threshold.

19. The method of claim 15, wherein the amplifier comprises a transconductance amplifier and the reduced loop gain is associated with a reduced transconductance of the transconductance amplifier, a reduced output impedance of the transconductance amplifier or both.

20. The method of claim 15, wherein the control circuit comprises a second amplifier in parallel with the amplifier; and     wherein reducing the loop gain comprises changing a second current provided by the second amplifier when the output current exceeds the current threshold that reduces an effective transconductance of the amplifier, reducing an effective output impedance of the amplifier or both.

\* \* \* \* \*